United States Patent [19]
Bendall et al.

[11] Patent Number: 5,602,463
[45] Date of Patent: Feb. 11, 1997

[54] DC POWER SUPPLY WITH ENHANCED INPUT POWER FACTOR USING A BUCK AND BOOST CONVERTER

[75] Inventors: Clark A. Bendall, Endicott; William A. Peterson, Vestal, both of N.Y.

[73] Assignee: Lockheed Martin Corporation, Bethesda, Md.

[21] Appl. No.: 568,884

[22] Filed: Dec. 11, 1995

[51] Int. Cl.$^6$ .................................................. G05F 1/56
[52] U.S. Cl. ........................................ 323/266; 323/268
[58] Field of Search ................................ 323/222, 265, 323/266, 268, 282; 363/37, 39

[56] References Cited

U.S. PATENT DOCUMENTS

| | | | |
|---|---|---|---|
| 4,729,088 | 3/1988 | Wong | 323/266 |
| 4,812,736 | 3/1989 | Albach et al. | 323/224 |
| 5,402,060 | 3/1995 | Erisman | 323/268 |
| 5,436,553 | 7/1995 | Pepper et al. | 323/259 |

OTHER PUBLICATIONS

"Analysis and Design of a Wide Input Range Power Factor Correction Circuit for Three–Phase Applications" R. Ridley et al, IEEE Applied Power Electronics Conference (APEC '93) 1993.

"A New Control Scheme for Buck & Boost Power Factor Correction Circuit", Y. M. Jiang, f. C. Lee, Switching Rectifiers for Power Factor Correction (VPEC), 1993.

"Current Waveform Distortion in Power Factor Correction Circuits Employing Discontinuous–Mode Boost Converters", K. Liu, Y. Lin, IEEE Power Electronics Specialists Conference (PESC '89) 1989.

"Power Factor Correction with Flyback Converter Employing Charge Control", W. Tang et al, IEEE Applied Power Electronics Conference (APEC '93), 1993.

Primary Examiner—Matthew V. Nguyen
Attorney, Agent, or Firm—Geoffrey H. Krauss

[57] ABSTRACT

A direct current or direct voltage power supply operating from a mains AC line is corrected for power factor so that the maximum power can be extracted from the source. The AC line is full-wave rectified, filtered and the resulting pulsating direct voltage is applied to a buck/boost switched inductor switched at a frequency higher than the line frequency. The buck/boost switching action is controlled so that the switchover between buck and boost modes occurs when the instantaneous value of the pulsating direct voltage equals the supply output voltage. The inductor current in the buck mode of operation is controlled to have an input voltage-squared characteristic; the inductor current in the boost mode is controlled to have an input voltage-proportional characteristic. The resulting average current makes the AC line current substantially proportional to the AC line voltage, to achieve substantially unity power factor.

14 Claims, 4 Drawing Sheets

DC POWER SUPPLY WITH ENHANCED INPUT POWER FACTOR USING A BUCK AND BOOST CONVERTER

This invention relates to control circuits for a direct current/voltage (DC) power supply energized from an alternating-current (AC) source and, more particularly, to a novel DC power supply which has an input power factor close to unity.

BACKGROUND OF THE INVENTION

DC power supplies energized by the AC power lines must convert the input AC voltage to a desired DC voltage level; this conversion can be accomplished in either an active manner or a passive manner. In either approach, it is desirable to achieve both a high input power factor (PF), and reduced total harmonic distortion of the AC input current. The non-linearities introduced with diode rectification of an AC source produce waveform distortion and harmonic current generation in the source current. These harmonic currents reduce the effective power factor to a value less than unity. A filter containing only passive components (e.g. inductors and capacitors) maybe employed to circulate these harmonic currents within the power supply, thereby increasing the power factor to approach unity.

The active conversion approach allows use of active power factor correction. Here, the AC input voltage is again rectified, but active switching is used and is controlled to improve the input current waveform, thus increasing the power factor. Traditionally, the input current waveform is caused to follow the input voltage waveform, by use of a separate feedback loop; the most common topology for active PF correction is the so-called 'boost' configuration, due to its continuous input current characteristics and ability to cause current flow over the full cycle of the input. The boost topology does have several undesirable attributes, among which are the need for the output voltage to exceed the peak of the input voltage, thus requiring a post regulator.

A relatively new PF correction topology is the so-called 'buck+boost' (or B+B) configuration which has several advantages over the 'boost' configuration, including a single stage power conversion and wider input/output voltage range. Yet, hitherto available B+B convertors generally included a power-factor-correcting input current feedback loop in addition to an output voltage/current feedback loop to provide output regulation, and required a mechanism to sense current flow through the switching inductance to provide current mode control, in addition to the input current sensor required for input current control.

It is desirable to provide a buck+boost Ac-to-DC convertor with a power factor enhancement control circuit achieving the aforementioned 0.95+ PF and reduced total harmonic distortion, while facilitating low switching frequency operation. Such a PF-corrected convertor may find particular usage in an electrically operated vehicle, which is becoming of increasing interest because of the perceived decrease in emissions by comparison with internal-combustion vehicles, and which is commonly supplied with electrical energy from batteries which have to be periodically recharged by DC voltages obtained from an AC-line-operated, high-PF power supply.

BRIEF SUMMARY OF THE INVENTION

In accordance with the invention, a Buck+Boost converter, for providing a DC voltage/current to a load from an AC source, rectifies the AC source voltage to generate unipolar voltage pulses having a peak value, and applies the pulsating DC voltage to a B+B convertor. The convertor/regulator has a controllable Buck switching device and a controllable Boost switching device, each with its controlled-conduction circuit coupled in series with an inductive element and with a current-sensing element, and receiving the unipolar voltage pulses. A unidirectionally-conducting device connected to the junction of switching inductor and the non-common-potential end of the Boost switching device controlled-conduction circuit, forms a first power supply output terminal, with respect to a second output terminal formed at a junction between a load current sensing means and the near-common-potential end of the Boost switching device controlled-conduction circuit; the power supply load is coupled between these first and second output terminals. A power-factor improving control means processes the sensed-current signal, as well as the output and pulsating DC voltage signals, to provide necessary separate drive signals to the control electrodes of the Buck and Boost switching devices, for operation in a Boost mode when the magnitude of the unipolar voltage across the series circuit is less than the desired output voltage and in a Buck mode when the magnitude of the unipolar voltage is greater than the desired output voltage.

In a presently preferred embodiment, for use with a sinusoidal input voltage source, the input power-factor and regulation are obtained by controlling the current flowing through said inductive element to be (a) substantially sinusoidal with time, and with a magnitude proportional to the unipolar peak voltage, in the Boost mode of operation, and (b) substantially sinusoidal-squared with time, and with a magnitude proportional to the square of the unipolar peak voltage, in the Buck mode of operation, whereby the AC source current is proportional to the AC source voltage with a power factor greater than about 0.95.

Accordingly, it is an object of the present invention to provide a novel Buck+Boost power supply, converting an AC input to a DC output, having a power factor enhancement circuit for achieving high input power factor.

This and other objects of the present invention will become apparent to those skilled in the art upon reading of the following written description, when considered in conjunction with the associated drawings.

DETAILED DESCRIPTION OF THE INVENTION

Figure 1:
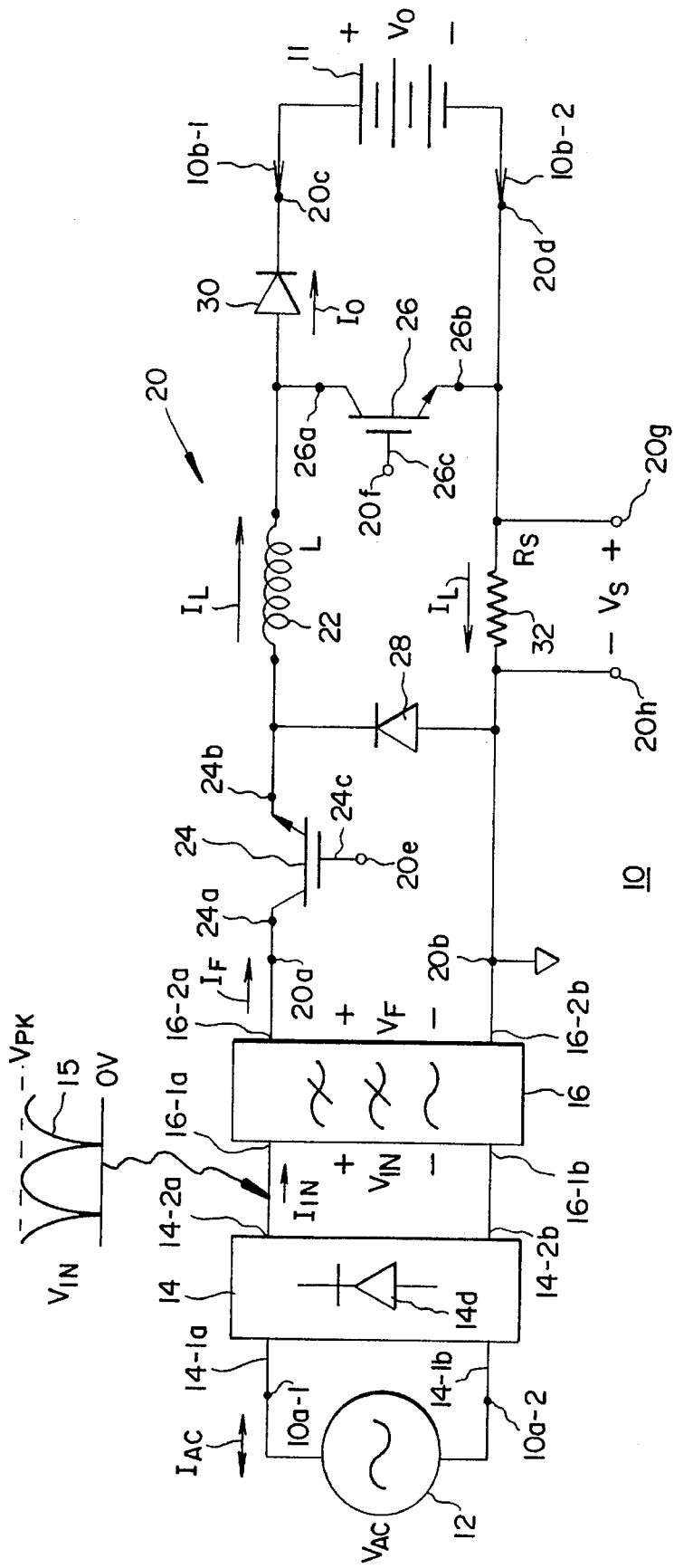
FIG. 1 is a schematic block diagram of the power-handling portions of a power supply according to the invention, shown in a configuration for use as a battery charger.

Referring first to FIG. 1, one presently preferred embodiment of a novel power supply 10 with enhanced input power factor control, provides a direct current (DC) output of selected magnitude $I_o$ at a selected unipolar or direct (DC)

voltage $V_o$ to a load 11, such as a DC battery to be charged, connected across a pair of output terminals 10b-1/10b-2. Power supply 10 receives operating potential at a pair of input terminals 10a-1/10a-2, from a source 12 of alternating, or bipolar, voltage $V_{AC}$. Source 12 may be the alternating-current (AC) line, and provides power in the form of a sinusoidal voltage at a line frequency F, together with a current $I_{AC}$, also at line frequency F, with a magnitude and waveshape which depends upon the characteristics at the power supply input. If the power factor PF is unity, the AC line current waveform is sinusoidal and in phase with the sinusoidal AC line voltage waveform; a power factor PF other than unity results in either a non-zero phaseshift angle or a distorted current waveform with respect to the voltage waveform.

In the power supply 10 of FIG. 1, AC source 12 is connected to a pair of input terminals 14-1a and 14-1b of a rectifier means 14, illustratively using a bridge connection of unidirectionally-conducting devices, such as solid-state rectifier diodes 14d and the like. Rectifier means 14 may be any conventional type, but preferably is a full-wave bridge rectifier, serving to provide a sequence of half-wave pulses of voltage $V_{IN}$, illustrated as waveform 15, at a positive rectifier output terminal 14-2a with respect to a negative rectifier output terminal 14-2b. The pulsating DC input voltage 15 will correspond to the absolute magnitude $V_{PK}$ of the input voltage source 12.

The pulsatory direct voltage 15 produced across terminals 14-2a and 14-2b is applied to the respective input terminals 16-1a and 16-1b of a filter means 16, having output terminals 16-2a and 16-2b connected to the input terminals of a Buck+Boost convertor 20, operating at a frequency f greater than the line frequency (i.e. f>F, typically with $1 \leq f \leq 100$ kHz). Filter 16 serves to prevent the higher-frequency (i.e. above line frequency F) 'hash' components (see, e.g. FIG. 5) of the current $I_F$ flowing into subsequent convertor/regulator 20, from being impressed upon the line-frequency current and voltage at inputs 10a-1/10a-2. The electromagnetic-interference (EMI) filter 16 has minimum energy storage in its reactive elements, such that the voltage waveshape 15 produced by the rectifier means 14 is essentially transmitted in undistorted manner to the regulator means input 20a. Thus, the action of filter means 16 leaves the main, low-frequency component of $V_{IN}$ and $I_{IN}$ essentially undisturbed, the line-frequency component $V_{IN}|_F = V_F|_F$ and $I_{IN}|_F = I_F|_F$. Pulsating DC voltage $V_F$ appears at the filter means positive output terminal 16-2a, with respect to the negative filter means output terminal 16-2b.

Convertor/regulator means 20 has a positive input 20a connected to filter positive output 16-2a and a negative input 20b connected to filter negative output 16-2b, which may be connected to circuit common potential; the power supply output terminals 10b-1 and 10b-2 are respectively connected to regulator output terminals 20c and 20d.

The regulator includes an energy-storage inductive element 22, of inductance L, through which current $I_L$ flows. A 'Buck' switching device 24 (which is shown, by way of example and not as a limitation, as an insulated-gate bipolar transistor (IGBT) and the like) has a controlled-conduction circuit, such as its collector 24a-to-emitter 24b circuit, in series connection with both inductor 22 and also a separate controlled-conduction circuit, such as the collector 26a-to-emitter 26b circuit, of a 'Boost' switching device 26 (which is again shown, by way of example only, as another IGBT). Buck switch 24 has a control electrode connected to control terminal 24c, which is connected to a regulator input 20e; the signal at terminal 20e/24c controls the flow of current between terminals 24a and 24b. Boost switch 26 has a control electrode connected to control terminal 26c, which is connected to a regulator input 20f; the signal at terminal 20f/26c controls the flow of current between terminals 26a and 26b.

A first unidirectional-current-conducting means 28, such as a semiconductor diode and the like, is in shunt generally across the inductor/boost device combination, and has an anode electrode connected to common potential, at regulator terminal 20b, and a cathode electrode connected to the junction between the Buck device emitter electrode 24b and inductor 22; device 28 allows free-wheeling regulator input operation by providing a current path when Buck switch 24 is in the OFF condition. A second unidirectional-current-conducting means 30, such as a semiconductor diode and the like, is in series with the regulator output and has a cathode electrode connected to the regulator positive output at regulator terminal 20c, and an anode electrode connected to the junction between the Boost device collector electrode 26a and inductor 22; device 30 allows current to flow to load 11 only when Boost switch 26 is in the OFF condition. Thus, for an inductor current $I_L$ flow toward the output, diode 28 is connected and poled to act as a freewheeling diode when Buck switch 24 is nonconductive, and freewheeling diode 30 becomes conductive when Boost switch 26 is nonconductive.

In accordance with one aspect of the invention, a current-sensing device 32, preferably in the form of a resistor 32 of resistance $R_s$, is connected between regulator terminal 20d and common potential terminal 20b; this current-sensing device will therefore be in electric series connection with, and have the same current $I_L$ flow therethrough, as inductor 22. The current-sensing resistive element 32 has a low impedance and does not appreciably affect the flow of current through the remainder of the circuit; typically, resistance $R_s$ is low enough that the generated sense voltage $V_s$ is at least an order of magnitude less than the output voltage $V_o$. A current-sample voltage $V_s = I_L * R_s$ appears at terminal 20g, with respect to common terminal 20h.

Operation of the Buck+Boost regulator 20 can best be understood by consideration of the duty cycle D, for sinusoidal input voltages $V_{AC}$, and continuous inductor current $I_L$, and assuming unity power factor so that $I_{IN} = kV_{IN}$, where K is a constant, and $V_{IN} = V_{PK} * \sin\omega t$ and $I_{IN} = kV_{PK} * \sin\omega t$:

1) During the Buck portion of the cycle, when device 24 is in an active-switching mode for control of output voltage $V_o$, and device 26 is in the non-conductive state:

$$D = V_o/V_{IN} = V_o/V_F = V_o/(|V_{PK} \sin \omega t|) \tag{1}$$

where $V_{PK}$ is the peak value of the input voltage, or rectified input voltage, and $\omega$ is the angular line frequency. The line-frequency components of output current $I_o$ and inductor current $I_L$ are equal to each other:

$$I_o|_F = I_L|_F \tag{2}$$

which, for a half-cycle sinusoidal input current in phase with the input voltage, gives (for line frequency component):

$$I_o = I_L = (I_{PK} \sin \omega t * V_{PK} \sin \omega t)/V_o \tag{2a}$$

where $I_{PK}$ is the peak input current. Equation (2a) can be simplified to:

$$I_o = I_L = (I_{PK} * V_{PK} \sin^2 \omega t)/V_o \qquad (2b)$$

2) During the Boost portion of the cycle, when device 24 continuously conducts and device 26 is actively switched to control output voltage $V_o$, the line-frequency components of inductor current $I_L$ and input current are equal:

$$I_{IN} = I_L = |I_{PK} \sin \omega t|. \qquad (3)$$

Figure 2:
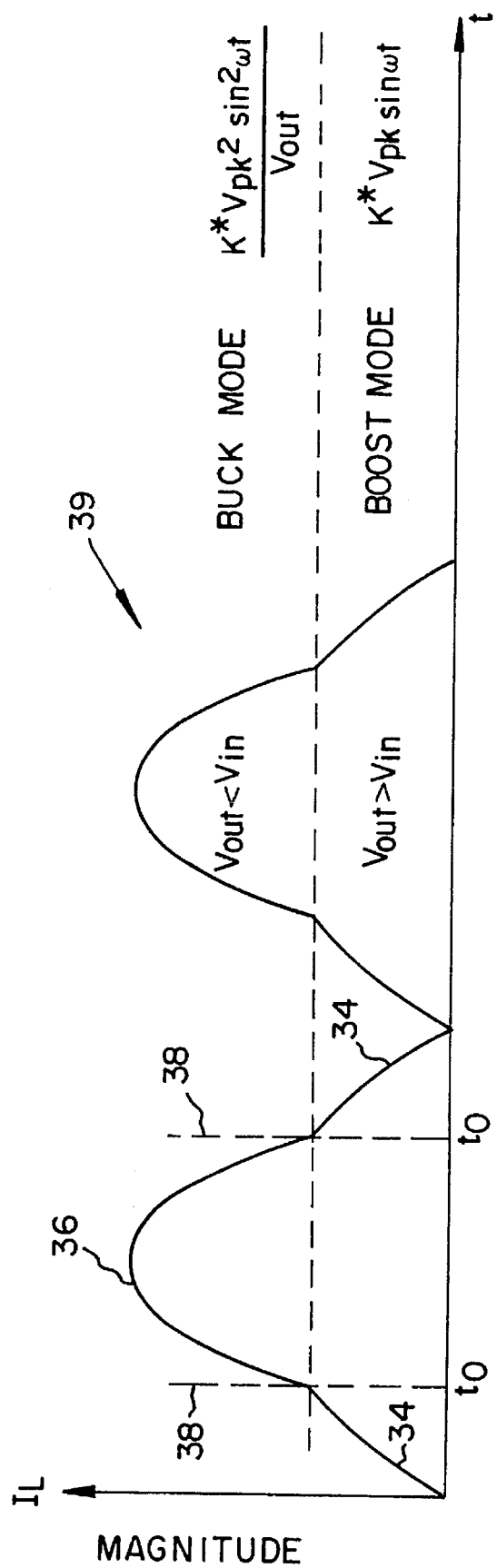
FIG. 2 is a graph of the desired, ideal inductor current $I_L$-vs-time relationship in the power supply of the present invention.

Thus, as shown in FIG. 2, for a DC output voltage, the line-frequency component of inductor current $I_L$ in the Buck mode must follow a $\sin^2 \omega t$ waveshape portion 34 and must have a $|\sin \omega t|$ waveshape portion 26 in the Boost mode. The modes switch at substantially symmetrical waveform transitions 38 which can only occur when the required first-order and second-order forms are at the point of equal magnitude, i.e. when the rectified input voltage $V_{IN} = |V_{PK} \sin \omega t| = V_o$. At such times, designated $t_0$, the input voltage is equal to the output voltage, and Eq. (2b) becomes $$I_L = I_o = |I_{PK} \sin \omega t_0| \qquad (2c)$$

which is the same as Eq. (3). In accordance with the invention, by the process of: (a) generation of two properly-scaled signals, one following Eq. (2b) and the other following Eq. (3); (b) the voltage (or analog) 'OR'ing of these two signals selects the signal with the larger voltage, to select the proper one of the two signals to generate the respective portions 34 and 36 of the desired line-frequency current-control waveform 39 of FIG. 2; and (c) forcing the line-frequency component of inductor current $I_L$ to follow this waveform 39, a sinusoidal input current $I_{AC}$ (and near-unity PF) will be provided.

Figure 3:
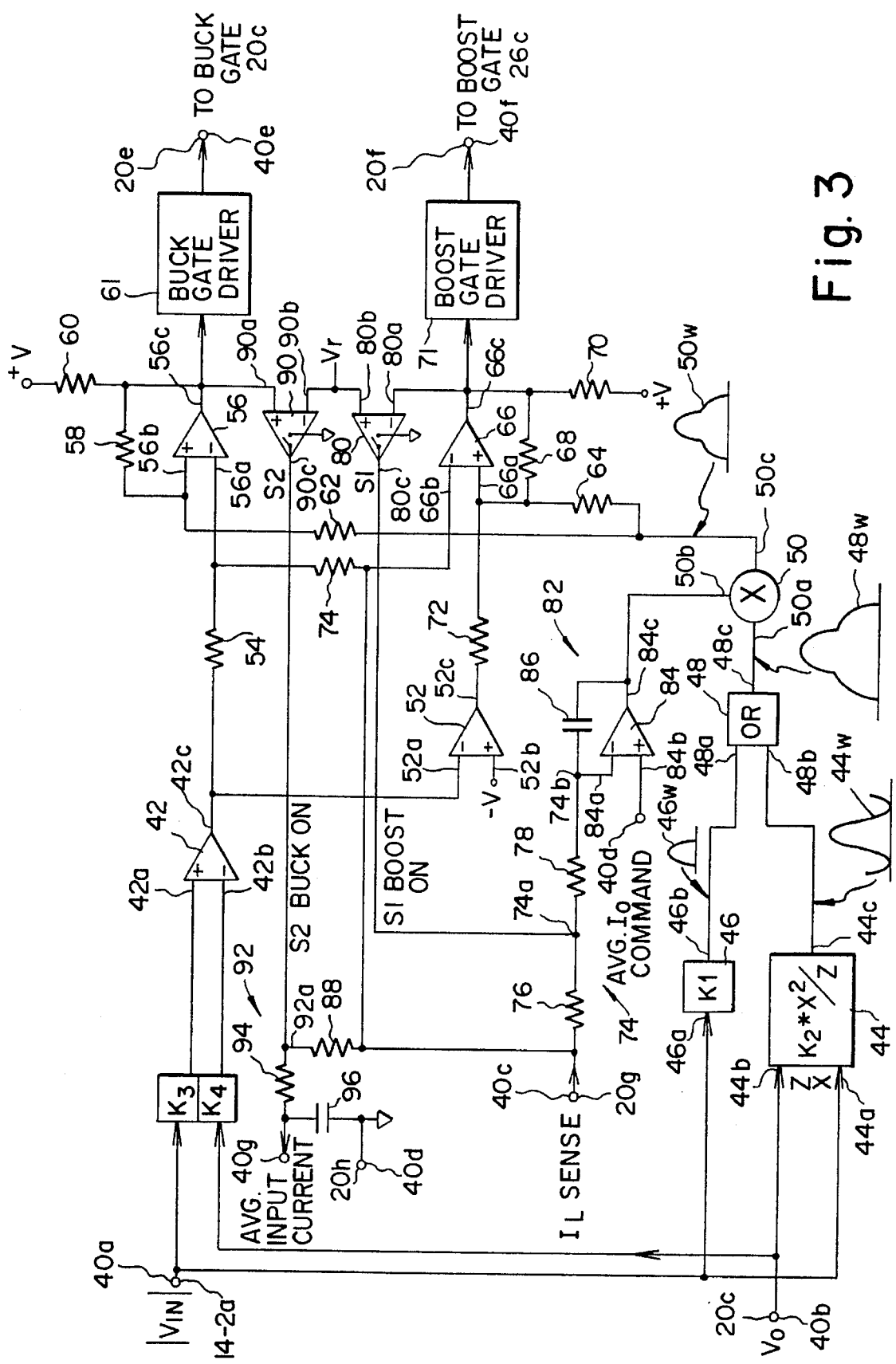
FIG. 3 is a schematic block diagram of a one possible controller for causing the current flow in the circuit of FIG. 1 to attain the characteristics illustrated in FIG. 2.

Referring now to FIG. 3, one presently preferred embodiment of a novel control circuit 40 for operating the power supply to achieve near-unity PF, is illustrated. Circuit 40 is coupled to the power regulator circuit 20 of FIG. 1 for controlling the Boost and Buck devices to realize the inductor current waveshape of FIG. 2. The $|V_{IN}|$ signal at terminal 14-2a is connected to input 40a, while input 40b receives the $V_o$ signal from terminal 20c and terminal 40c receives the sensed inductor current signal at terminal 20g, all with respect to circuit common potential at input 40d, connected to terminal 20h. Positive operating potential +V and negative operating potential –V are provided, with respect to circuit common potential at terminal 40d, in well known manner for powering operational amplifiers and the like.

The control circuit provides at a first output 40e the Buck gate drive signal for terminal 20e, and provides at a second output the Boost gate drive signal for terminal 20f. Another output 40g provides a representation of the average input current (as drawn from the AC power source) as a low-pass-filtered version of the current passing through the Buck device 24 (obtained by synchronous demodulation, or commutation, of the sensed inductor current).

The $|V_{IN}|$ signal at input 40a is applied to: a non-inverting (+) input 42a of a first comparator 42 (after scaling by a constant $k_3$, which is may be equal to 1); a X input 44a of a multiplier means 44; and to the input 46a of an amplifier means 46, having a fixed gain $K_1$. The signal waveform 46w at the output 46b of the amplifier 46 is a full-wave sinusoid $K_1 * |V_{IN} \sin \omega t|$, which is applied to a first input 48a of a two-input OR circuit 48.

The $V_o$ signal at input 40b is applied to both the inverting (–) input 42a of the first comparator 42 (after scaling by a constant $k_4$, which may be equal to 1) and to a Z input of multiplier means 44, which generates, at its output 44c, a signal of form $K_2 * X^2/Z$, having a signal waveshape 44w of the $\sin^2 \omega t$ form, for connection to the second input 48b of the OR circuit. The OR circuit 48 provides at its output 48c the greater amplitude of either input signal; gain constants $K_1$ and $K_2$ are selected to cause the output $\sin/\sin^2$ waveform 48w to have the desired characteristics; in general both scaling constants should be equal, so that the two waveforms 44w and 46w are equal when the input voltage equals the output voltage. This signal 48w is applied to a first input 50a of a multiplier circuit 50.

The first comparator output 42c is connected to an inverting (–) input 52a of a second comparator 52, receiving the fixed negative operating potential –V at its second (+) input 52b. The first comparator output signal is also connected through a first resistor 54 to an inverting (–) input 56a of a third comparator 56, which has it non-inverting (+) input 56b connected through a feedback resistance 58 to its output 56c; the output 56c is also connected through a pull-up resistor 60 to positive operating potential +V. Output 56c is also connected through a Buck gate driver means 61 to Buck gate drive terminal 40e/20e; Buck gate driver means 61 receives the Buck switching information from comparator 56 and provides the necessary current gain, isolation and/or level shifting needed to produce a signal at terminal 20e that is essentially synchronous with the signal at output 56c, but conditioned for properly controlling switching device 24. Comparator input 56b is also connected through another resistance 62 to the multiplier output 50c, which is similarly connected through resistance element 64 to a non-inverting (+) input 66a of a fourth comparator 66. Input 66a is likewise connected through a feedback resistance 68 to its output 66c; output 66c is connected through a Boost gate driver means 71 to Boost gate drive terminal 40f/20f. Boost gate driver means 71 receives the Boost switching information from comparator 66 and provides the necessary current gain, isolation and/or level shifting needed to produce a signal at terminal 20f that is essentially synchronous with the signal at output 66c, but conditioned for properly controlling switching device 26. Output 66c is also connected through a pull-up resistor 70 to positive operating potential +V. Input 66a is also connected through resistor 72 to second comparator output 52c. Inverting (–) input 66b (after scaling by a constant $k_3$, which is here, due to a direct connection, equal to 1) is coupled to the $I_L$ sense signal input 40c, which is also connected to input 56a through a resistance element 74.

The sensed inductor current $I_L$ signal at input 40c is coupled through a Boost demodulator subcircuit 74, comprised of series resistors 76 and 78, a 'Boost on' switch means S1 (here, the switched-to-common, "open-collector" output 80c of another comparator 80, having an inverting – input 80a coupled to the Boost gate drive at terminal 40f and a non-inverting + input 80b receiving a reference voltage $V_r$); the Boost switch is selected to 'close' switch $S_1$ (output 80c) to common potential if the Boost gate drive signal is greater than $V_r$, indicative of the Boost device being in ON condition. Resistance element 78 is the input resistance of a low-pass filtering integrator 82, here comprised of an operational amplifier 84 having an inverting – input 84a coupled to resistor 78 and to a first terminal of an integration capacitor 86, having its other terminal coupled to amplifier output 84c. The amplifier non-inverting + input 84b receives an externally-provided 'average output current command' level at terminal 40d. The demodulated, smoothed $I_L$ sensed signal is an analog level applied to the other input 50b of the multiplier means 50.

A signal representative of the average input current is provided at terminal 40g, by demodulation and filtering of the sensed inductor current, responsive to the ON condition of the Buck switching device 24; the sensed inductor current at terminal 40c is passed through a series resistance to a 'Buck on' switch means S2 (here, the switched-to-common, "open-collector" output 90c of another comparator 90, having a non-inverting + input 90a coupled to the Buck gate drive at terminal 40e and an inverting − input 90b receiving the reference voltage $V_r$); the Buck switch is selected to 'close' switch $S_1$ (output 80c) to common potential if the Buck gate drive signal is less than $V_r$, indicative of the Buck device being in OFF condition. An integrating lowpass filter means 92 is subsequently provided by another series resistance element 94 and a shunt capacitor 96, coupled from output terminal 40g to common potential The sinωt waveform 46w and the sin²ωt waveform 44w applied to the OR circuit (which we here fabricated with an additional operational amplifier) will automatically cause the reference waveform to assume the proper waveshape at the transition between Boost and Buck modes. However, the comparators 56/66 are still required to insure that only one of devices 24 and 26 will switch in each mode. The output 42c of the input comparator 42 is in the high impedance state in the Buck mode, so that the Buck device 24 is allowed to switch; simultaneously, the output 52c of comparator 52 is pulled to a negative voltage to force the Boost switching device 26 to remain in the OFF condition. The current-sense signal on input 56a is pulled down slightly through the R54/R74 resistive divider, to force the Buck device 24 to stay in the ON condition while in the Boost mode, without device 24 losing its current limiting ability. Simultaneously, comparator output 52c goes to its open-collector condition, allowing Boost device 26 to be switched.

Figure 4:
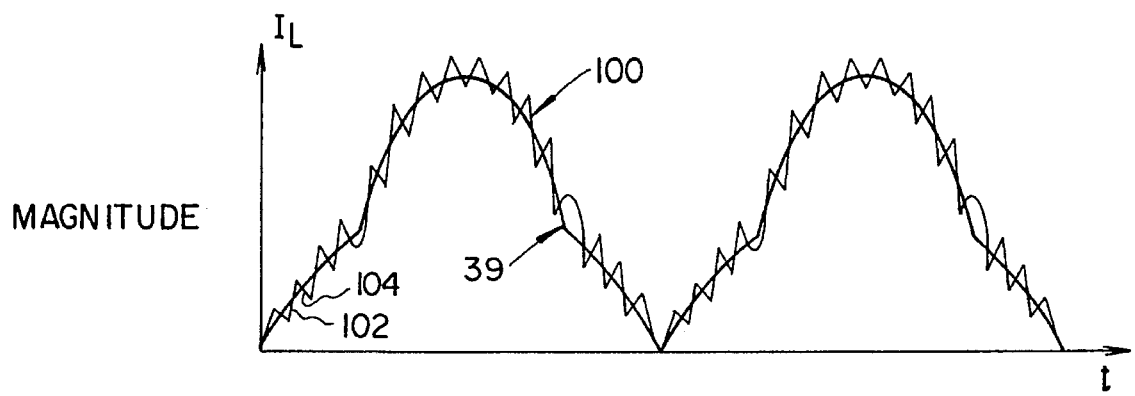
FIGS. 4–6 illustrate actual waveforms, similar to those of FIG. 2, for derivation of various currents and illustrative of operation of the present invention.

Referring now to FIG. 4, the reference waveform 39 is a 'guide' for the inductor current to follow; the actual inductor current waveform 100 may instantaneously differ from this ideal waveform 39. Comparators 56 and 66 operate to minimize the deviations between the ideal current and the actual current sensed by resistor 32 and provided as the sense voltage signal at input 40c. Only one of comparators 56/66 is active, or switching, in each of the two modes (Buck or Boost). When either comparator 56 or 66 is active, the output 56c or 66c, respectively, appears as an open-collector, so that a small amount of hysteresis is added to the reference signal on the non-inverting + input 56b or 66a, respectively. The associated device 24 or 26, respectively, is turned to the ON condition, to cause a rise, or increasing ramp portion 102, in the inductor current $I_L$. Conversely, if the sensed current analogue voltage at terminal 40c rises, the increasing signal magnitude is couple to the inverting comparator inputs 56a and 66b; when the inverting input signal reaches the magnitude of the voltage on the comparator non-inverting input 56b/66a, the corresponding comparator output 56c or 66c, respectively, falls to a negative voltage value, decreasing by a small amount the reference voltage on the non-inverting input of the same comparator. The corresponding device 24 or 26 turns OFF and the inductor current falls as a decreasing ramp portion 104. The sensed current analogue voltage at terminal 40c proportional falls until the signal at the inverting inputs is below the signal at the non-inverting input, causing the comparator outputs to be again switched and the cyclic application of portions 102/104 repeated; the length of time for each portion is adjusted by the action of the comparators to cause the actual current 100 to piecewise approximate the desired current 39.

Figure 5:
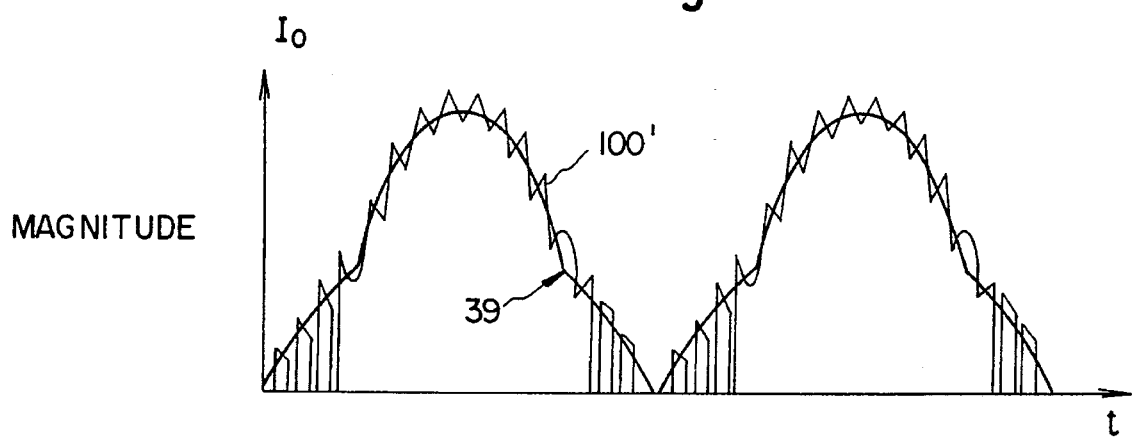
Figure 6:
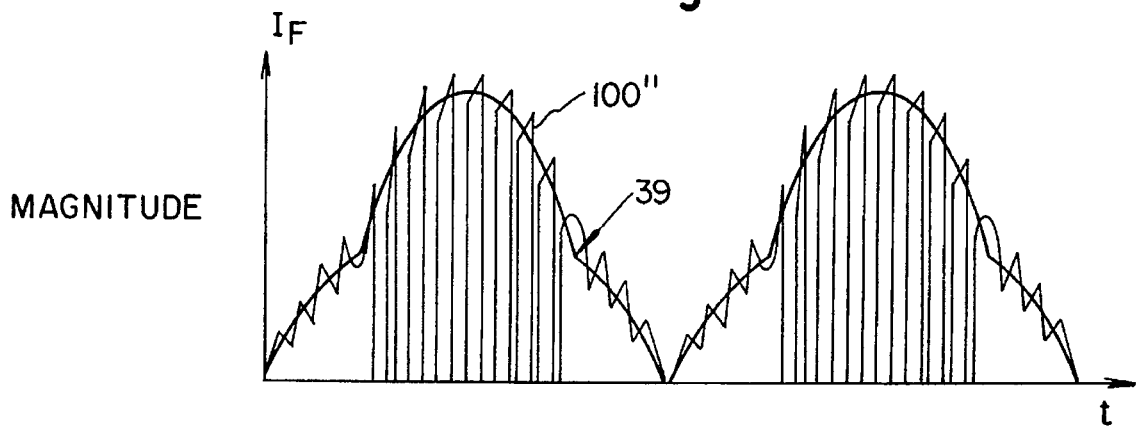

Both the input current $I_{IN}$ and the output current $I_o$ can be determined from the inductor current $I_L$; an input current analogue voltage signal and/or an output current analogue voltage signal can be particularly derived from the inductor current signal $V_s$ (FIG. 1). When Boost device 26 is ON, the output current $I_o$ is zero. When the Buck device 24 is ON, the inductor current $I_L$ is also the regulator input current $I_F$. The unfiltered output current 100' (which is a portion of the actual inductor current 100) is shown in FIG. 5, while the unfiltered input current 100" (which is the complementary portion of inductor current 100) is shown in FIG. 6; the 'choppiness' of each waveform is due to the well-above-line-frequency switching operation of devices 24 and 26. Each of these unfiltered, 'chopped' waveforms is demodulated by action of the associated one of switched-output comparators 80 and 90; comparator 80 acts to demodulate the output current and comparator 90 acts to demodulate the input current. Thus, the comparator 80 output 80c appears as a first 'switch' S1 which is closed (to common potential) when Boost switching transistor device 26 is ON, to temporarily ground node 74a; output current waveform 100' is thus yielded at node 74a. Operational amplifier 84 acts as a low-bandwidth error amplifier to generate a DC error signal, relative to the analog voltage signal value at terminal 40d, commanding an average $I_o$ value. This DC error voltage is provided at multiplier input 50b and is used in means 50 to multiply the reference waveshape 48w, at input 50a, with the proper amplitude for the desired output current. In order for the correct output waveform to be generated from multiplier 50, the magnitude of the voltage applied at input 50b must not change during a half-cycle of input voltage at frequency (sinωt). The other 'switched-output' comparator 90 provides a second commutation switch S2, which is closed to common potential, applying that potential at node 92a, when the Buck switching transistor device 24 is OFF to demodulate waveform 100"; the commutated 100" waveform is lowpass-filtered by resistor 94 and capacitor 96, to generate the average input current analog signal at output 40g. This signal can be used to control the current drawn from source 12 to a maximum safe limit.

By way of example only, and not for limitation, several power supplies using the high-power-factor regulator 20 were constructed and operated from a single-phase AC source: testing yielded power factor PF greater than 0.97 at half-load and about 0.99 at full-load, over a wide input/output voltage range, with relatively low (less than 25 kHz., and typically less than 10 kHz.) switching frequencies and efficiencies in the 97% range for a 240 VAC input and up to 55 Ampere constant output current convertor, with 0–450 Vdc compliance range, at up to 10 KW power level. No input current sense or feedback loop is required, nor is any output current sense required. The reference waveform automatically makes proper waveshape transition at the Buck/Boost transition point and hysteretic current control provides substantially instantaneous cycle-by-cycle current limiting.

Other embodiments of the invention will be apparent to those skilled in the art. For example, while the Buck+Boost converter circuit has been shown for use as a battery charger, it could instead be used as a direct-voltage power supply and the like, energizing a resistive or active load 11. While the control circuit has been described in terms of analog circuitry, digital control circuitry could also be used. Thus, many variations and modifications will now become apparent to those skilled in the art. It is our intent to be limited only by the extent of the appending claims and not by way of the details or instrumentalities specifically described herein.

What is claimed is:

1. A power supply for providing a DC voltage/current to a load from an AC source, comprising:

I) rectifying means, energized by said AC source, for generating unipolar voltage pulses having a peak value; and II) a buck+boost convertor having:
   an inductive element with first and second terminals;
   a controllable buck switching device having a controlled-conduction circuit coupled to said inductive element first terminal, and a control electrode at which a signal will control current conduction through said controlled-conduction circuit;
   a controllable boost switching device having a controlled-conduction circuit coupled to said inductive element second terminal, and a control electrode at which a signal will control current conduction through said controlled-conduction circuit;
   a current-sensing element coupled in series with the inductive element;
   a first unidirectionally-conducting element connected across a portion of said series circuit and poled to cause current flow in a first direction through said inductive element when said buck switching device is in a non-conductive OFF condition and the inductive current flows through one of the load and the boost switching device;
   a second unidirectionally-conducting element connected in series with said load and poled to cause current flow through said load when said boost switching device is not in the conductive condition;
   said unipolar voltage pulses being applied to a series circuit formed of the buck and boost switching device controlled-conduction circuits, said inductive element, and said current-sensing element; and
   control means, coupled to said current-sensing element and to said buck and boost switching devices, for causing the AC source current to be proportional to the AC source voltage, by operating said convertor (a) in a buck mode, by controlling the inductive element current to be substantially proportional to the square of the magnitude of the AC input voltage when the magnitude of the unipolar voltage across said circuit is greater than the desired output voltage, and (b) in a boost mode, by controlling the inductive element current to be substantially proportional to the magnitude of the AC input voltage when the magnitude of the unipolar voltage across said circuit is less than the desired output voltage.

2. The power supply of claim 1, wherein said control means includes: first means for generating a first signal having an input voltage waveshape at the line frequency; second means for generating a second signal having an input voltage-squared waveshape at the line frequency; third means for generating a third signal by selection of a proper portion of one of the first and second signals dependent upon the instantaneous relationship of the input and output voltages; and fourth means for forcing the line-frequency component of the inductor current ($I_L$) to follow the third signal.

3. The power supply of claim 2, wherein said third means is an OR'ing circuit receiving the first and second signals and having an output at which the larger magnitude one of said first and second signals appears.

4. The power supply of claim 3, wherein said first means includes a subcircuit having a selected gain, and providing said first signal responsive to receipt of the absolute value of the input voltage.

5. The power supply of claim 3, wherein said second means includes means, receiving the absolute value of the input voltage as an X input and receiving the output voltage as a Z input, for generating said second signal as a function of $X^2/Z$.

6. The power supply of claim 3, wherein the buck switching device and the boost switching device are enabled for conduction in mutually-exclusive manner, responsive to comparison of the absolute input and output voltages.

7. The power supply of claim 6, wherein said third means further includes means for modifying the magnitude of said third signal responsive to a magnitude of error between the sensed inductive current and a commanded average output current.

8. The power supply of claim 1, wherein said control means controls said buck and boost switching devices to switch at a switching rate greater than the line frequency of said AC source.

9. The power supply of claim 1, wherein said load is an electrical storage battery to be charged.

10. The power supply of claim 1, wherein at least one of said first and second unidirectional-conducting elements comprises a semiconductor diode.

11. The power supply of claim 1, wherein said current-sensing element comprises an electrical resistance.

12. The power supply of claim 11, wherein the sensed voltage generated across said resistance is at least an order of magnitude less than said output voltage.

13. A method for generating a DC voltage or current from a source of sinusoidal alternating AC voltage, comprising the steps of:

rectifying the AC voltage to produce sinusoidal pulsating direct DC voltage at a line frequency;

applying the pulsating DC voltage to a buck+boost power converter including a buck switch, a boost switch, and an inductor;

operating the buck+boost power converter at a repetition rate greater than the line frequency;

operating, when a present value of the pulsatory DC voltage is greater than the output voltage, the buck and boost switches in a buck mode with a current flowing through the inductor having an input voltage-squared characteristic;

operating, when the present value of the pulsatory DC voltage is less than the output voltage, the buck and boost switches in a boost mode with the inductor current having a input voltage-proportional characteristic; and controlling the buck and boost mode operations to cause an AC source current to be proportional to the AC source voltage.

14. The method of claim 13, wherein the controlling step includes the substep of obtaining a power factor greater than about 0.90.

* * * * *